US011514332B2

(12) United States Patent
Clark et al.

(10) Patent No.: US 11,514,332 B2
(45) Date of Patent: Nov. 29, 2022

(54) VOICE PROMPT AVATAR (71) Applicant: INTERNATIONAL BUSINESS MACHINES CORPORATION, Armonk, NY (US)

(72) Inventors: Adam T. Clark, Mantorville, MN (US); Nathaniel D. Lee, Rochester, MN (US); Daniel J. Strauss, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 15/935,103

(22) Filed: Mar. 26, 2018

(65) Prior Publication Data
US 2019/0294974 A1 Sep. 26, 2019

(51) Int. Cl.
G10L 15/00 (2013.01)
G06N 5/02 (2006.01)
G10L 15/22 (2006.01)
G10L 13/00 (2006.01)

(52) U.S. Cl.
CPC ............... *G06N 5/02* (2013.01); *G10L 13/00* (2013.01); *G10L 15/22* (2013.01); *G10L 15/222* (2013.01); *G10L 2015/223* (2013.01)

(58) Field of Classification Search
CPC ..... G10L 15/22; G10L 15/222; G10L 15/223; G10L 13/00; G10L 2015/223; G06N 5/02
See application file for complete search history.

(56) References Cited

U.S. PATENT DOCUMENTS

| RE45,132 E | 9/2014 | Caporale et al. |
| 9,576,571 B2* | 2/2017 | Stewart .................... G10L 17/26 |
| 9,721,570 B1* | 8/2017 | Beal ........................ G10L 17/00 |
| 2012/0016678 A1* | 1/2012 | Gruber ..................... G06F 9/54 |
| | | 704/E21.001 |
| 2016/0344870 A1 | 11/2016 | Nair |
| 2017/0358296 A1* | 12/2017 | Segalis ............... H04M 3/4936 |

OTHER PUBLICATIONS

S. J. du Preez, M. Lail and S. Sinha, "An intelligent web-based voice chatbot," IEEE EUROCON 2009, 2009, pp. 386-391, doi: 10.1109/EURCON.2009.5167660. (Year: 2009).*

Mell, et al., "The NIST Definition of Cloud Computing," National Institute of Standards and Technology, U.S. Department of Commerce, Special Publication 800-145, Sep. 2011, pp. 1-7.

IBM, "Conversation: Build chatbots that understand natural language and deploy them on messaging platforms and websites, on any device", Watson Developer Cloud, https://www.ibm.com/watson/developercloud/conversation.html, © 2017 IBM, printed on Feb. 28, 2017, pp. 1-3.

* cited by examiner

*Primary Examiner* — Edgar X Guerra-Erazo
*Assistant Examiner* — Uthej Kunamneni
(74) *Attorney, Agent, or Firm* — L. Jeffrey Kelly (57) ABSTRACT A method, computer program product, and system for a cognitive dialoguing avatar, the method including identifying a user, a target entity, and a user goal, initiating communication with the target entity, evaluating cognitively a question from a dialog with the target entity, determining cognitively an answer to the question by evaluating stored user information to progress to the user goal, communicating the determined answer to the target entity.

18 Claims, 6 Drawing Sheets

VOICE PROMPT AVATAR

BACKGROUND

The present invention relates generally to a method, system, and computer program product for information processing, and more particularly to a method, system, and computer program product for providing a cognitive response to a question.

Automated voice-controlled systems are relied on by many institutions to process phone calls from customers and/or clients. The automated voice-controlled systems may have menu choices that route a request to a specific phone extension or may have a complex system which collects customer information. The automated voice-controlled systems may be completely automated or may route to a person, for example, a person in customer service. Automated voice-controlled systems allow companies to reduce a number of customer service representatives required to handle a volume of calls, resulting in cost-efficient support. However, these systems can prove to be frustrating, complex, and a waste of time for customers who spend valuable time sifting through voice prompts, searching for the right extension/answer/option.

SUMMARY

Embodiments of the present invention disclose a method, computer program product, and system for a cognitive dialoguing avatar, the method including identifying a user, a target entity, and a user goal, initiating communication with the target entity, evaluating cognitively a question from a dialog with the target entity, determining cognitively an answer to the question by evaluating stored user information to progress to the user goal, communicating the determined answer to the target entity.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present invention relate to the field of information processing, and more particularly to providing a cognitive response to a question. The following described exemplary embodiments provide a system, method, and program product to, among other things, provide a cognitive response to a question. Therefore, the present embodiment has the capacity to improve the technical field of information processing by providing a voice prompt avatar capable of answering questions from an automatic voice-prompt system in order to achieve a user goal.

This invention provides a cognitive solution for a user who wishes to avoid wasting time on traversing complex menu systems of a voice-prompt service. A cognitive dialoguing avatar is provided which may listen to a voice prompt system and respond appropriately to a question in order to accurately traverse the menu system as the user had directed. The avatar may be trained or configured with information about the user, for example, a user name, an address, and an account number. The avatar may be configured to understand a goal of the interaction with the voice-prompt service. The avatar may guide a dialoguing system to answer questions from the voice-prompt service which would most likely converge on an option aligning with the goal. The avatar may initiate a dialog with the voice prompt system, listening for requests that can be answered based on knowledge of the user and/or the user's goal. As each request is processed, the avatar may evaluate the question and options to identify whether it has information to answer the question or if a voice prompt option can be responded to as the most likely to progress towards the goal.

Figure 1:
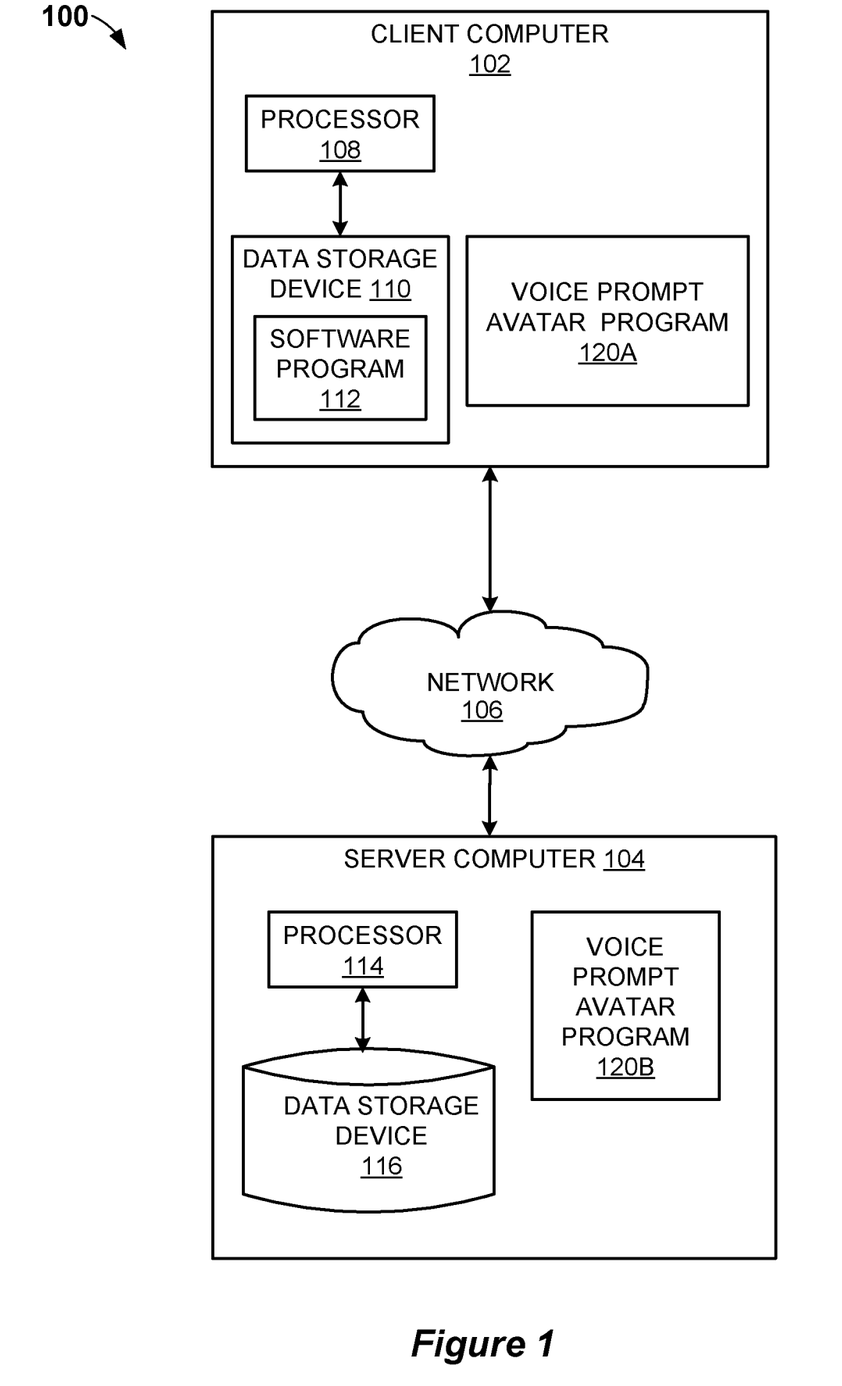
FIG. 1 is a functional block diagram illustrating a distributed data processing environment, in accordance with an embodiment of the present invention.

Referring now to FIG. 1, a functional block diagram illustrating a system 100 in a networked computer environment, in accordance with an embodiment of the present invention, is shown. The system 100 may include a client computer 102 and a server computer 104. The client computer 102 may communicate with the server computer 104 via a communications network 106 (hereinafter "network"). The client computer 102 may include a processor 108, and a data storage device 110 that is enabled to host and run a software program 112 and a voice prompt avatar program 120A. The client computer 102 is enabled to interface with a user and communicate with the server computer 104. The server computer 104 may also include a processor 114 and a database 116 that is enabled to run a voice prompt avatar program 120B. In an embodiment, the client computer 102 may operate as an input device including a user interface while the voice prompt avatar program 120B run primarily on the server computer 104. In an alternative embodiment, the voice prompt avatar program 120A processor 114 and a database 116 that is enabled to run a voice prompt avatar program 120B. In an embodiment, the client computer 102 may operate as an input device including a user interface while the voice prompt avatar program 120B run primarily on the server computer 104.

It should be noted, however, that processing for the voice prompt avatar program 120A, 120B may, in some instances be shared amongst the client computer 102 and the server computer 104 in any ratio. In another embodiment, the voice prompt avatar program 120A, 120B may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104 via the network 106. As described below with reference to FIG. 4, the client computer 102 and the server computer 104 may each include internal and external components. In other embodiments, the server computer 104 may be implemented in a cloud computing environment, for example, cloud computing nodes 510, as described in relation to FIGS. 5 and 6 below. Similarly, the client computer 102 may be implemented in the cloud computing environment, for example, laptop computer 540C as shown in FIG. 5.

In an embodiment, the system 100 may include any number of client computers 102 and/or server computers 104; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

According to an embodiment, the voice prompt avatar program 120A, 120B may be generally configured to collect user information, collect a user goal, collect target information, initiate a dialog with the target, analyze a question, and to either determine a correct response to the question and provide the response, or alert the user to provide the response, to assist the user in achieving a goal. The voice prompt avatar method is explained in further detail below with respect to FIGS. 2-6.

Figure 2:
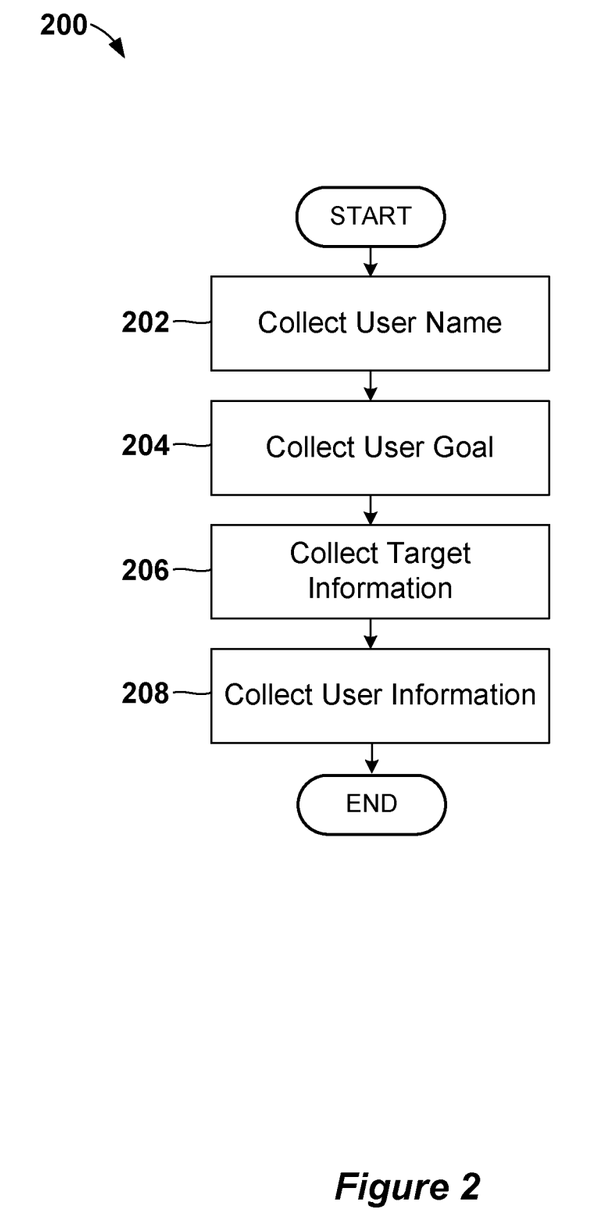
FIG. 2 is a flowchart depicting operational steps of a training flowchart within the data processing environment of FIG. 1, in accordance with an embodiment of the present invention.

Referring now to FIG. 2, and with continued reference to FIG. 1, a training flowchart 200 is shown in accordance with an embodiment of the present invention. The training flowchart 200 may be trained or configured with information about a user, a user goal, and a target.

Beginning with step 202, a user name may be collected. The user name may be a name for which an account is registered at a target company. The account may be the account for which the voice prompt avatar program 120A, 120B may be used. The user name may be a legal name of the user, a nickname of the user, an e-mail userid, or another name. A user may have multiple user names, for example, the user may have registered with different names for different accounts for different target companies or entities the user may communicate with. The target company or entity may be a bank, a mortgage company, a store, a utility company, a school, a medical service provider, or any company or entity that the user may interact with.

At step 204, a user goal may be collected from the user. The user goal may be what the user intends to accomplish during an interaction with the target company or entity. The user may trigger the voice prompt avatar program 120A, 120B to start and trigger the program to take steps towards achieving a function or goal. There may be more than one user goal or purpose. The information collected in the steps of the training flowchart 200 may be collected by typing a response to a questionnaire provided by the prompt avatar program 120A, 120B. The information may be collected by a user typing in information in sentence or loose form, for example, "check my savings account balance at the New Bank and my account number is 456123". The information may be collected by voice response to one or more questions provided by the voice prompt avatar program 120A, 120B. The information may be collected by a voice command to the voice prompt avatar program 120A, 120B, for example, "what is my mobile phone charge balance?" or "what time does the store close on Saturday?" One or more questions in the questionnaire may be created by a voice prompt avatar program 120A, 120B based on analysis of the user goal. For example, an entity involved with the goal may need specific fields of information. Additionally, the user goal may need more specific information to be completely identified. An external program may be used to analyze the user goal and identify information needed, for example an external program which explores data, provides predictive analytics and creates dashboards may be IBM Watson® Analytics (Watson and all Watson-based trademarks and logos are trademarks or registered trademarks of International Business Machines Corporation and/or its affiliates). A natural language processing system may be used which includes a deep learning question and answer system.

Next at step 206, the training flowchart 200 may collect target information, where the target information is regarding the company or entity the user wishes to communicate with. The target information may include the entity name, the entity phone number, the entity web page, among other information. The target information may come from the user, from a web page, from prior information collected by the voice prompt avatar program 120A, 120B, or from other methods. The target information may include a voice prompt tree for the target, for example, once the entity phone number is dialed, the first question from the entity may include "press or say 1 for English", and the second question may include "press or say 1 for account balance, press or say 2 for service problems, press or say 3 to pay your bill, etc."

At step 208, the training flowchart 200 may collect user information. The user information may include an account name, an account password, an account number, answers to one or more account security questions, social security number, home address, a claim number, a travel date, a birthdate, a pin number, a passcode, and other information. The user information collected may include information which the target is known to request during a phone call.

The voice prompt avatar program 120A, 120B, may retain information and collect further information for future use. For example, information for a mortgage may be retained, a name of the account owner, an account number, a registered e-mail, a password, a security answer for a question, a mortgage holder, a mortgage holder phone number, an address of the mortgaged property, and other information the mortgage holder may need to assist the user during a voice prompt conversation.

Figure 3:
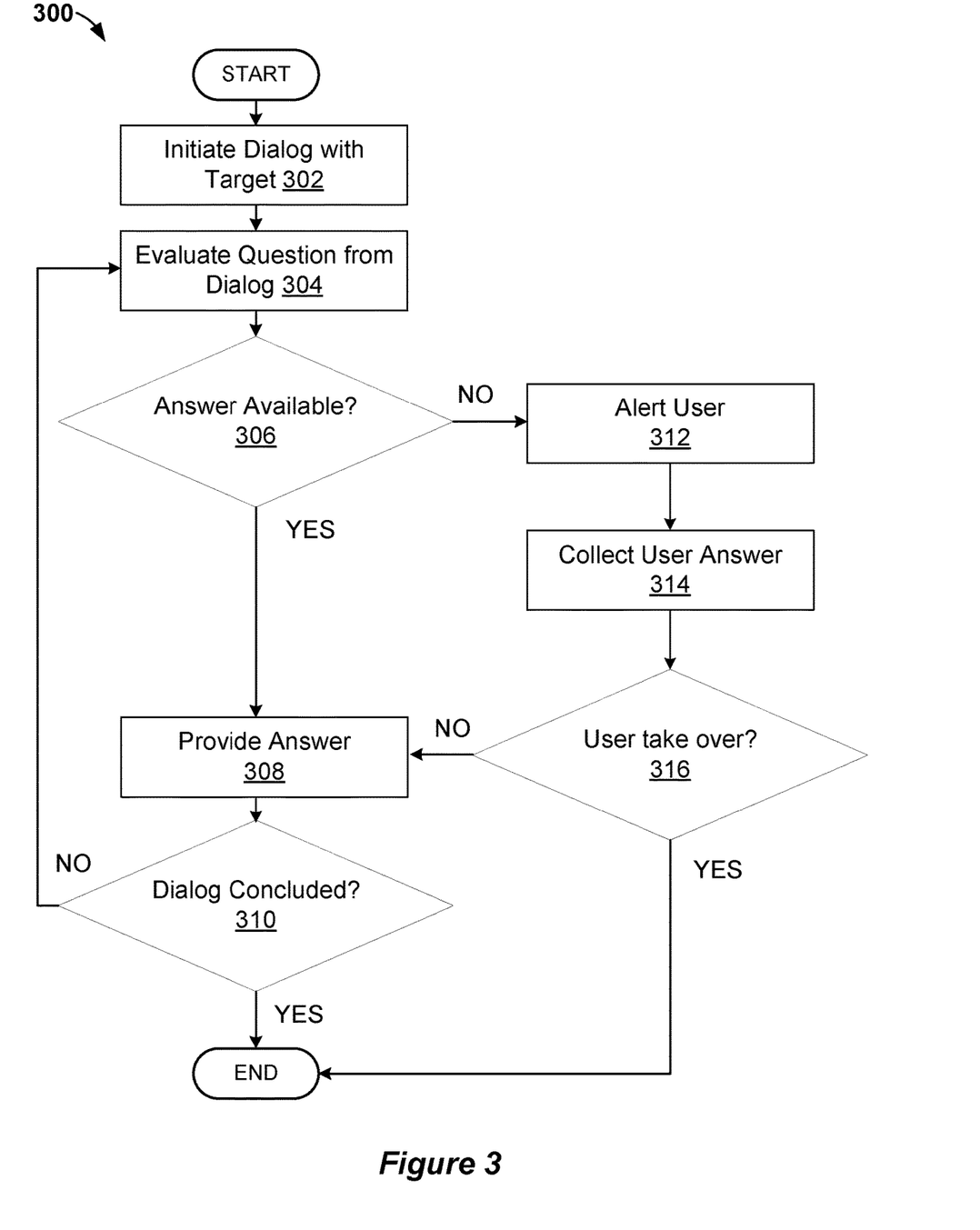
FIG. 3 is a block diagram depicting operational steps of a voice prompt avatar program within the data processing environment of FIG. 1, shown in accordance with an embodiment of the present invention.

Referring now to FIG. 3, and with continued reference to FIGS. 1 and 2, a process flowchart 300 of the voice prompt avatar program 120A, 120B is shown in accordance with an embodiment of the present invention. The process flowchart 300 may use information collected from the training flowchart 200 as described above for the voice prompt avatar program 120A, 120B.

Step 302 includes initiating a dialog with the target. In an embodiment, the voice prompt avatar program 120A, 120B may call the target using the target phone number obtained in step 206 of the training flowchart 200 above, and the dialog may occur during a phone call or an automated voice prompt system. Alternatively, the dialog may occur online, or another method of interaction between the voice prompt avatar program 120A, 120B and the target.

At step 304, a statement and/or a question received from the target during the dialog may be evaluated. The voice prompt avatar program 120A, 120B may traverse audio communication provided by the automated voice prompt system of the target by listening to audio communications and detect an option to select an action from amongst a plurality of alternative actions, and select an action based on determining that the action conforms to the goal of the user. The statement and/or question may be cognitively analyzed to determine a content of what is stated and a question provided during the dialog. Analysis of the information and the question may be performed by an external program or application. An example of an external program which explores data, provides predictive analytics and creates dashboards may be IBM Watson® Analytics. A natural language processing system may be used which includes a deep learning question and answer system. Examples of a statement or a question may include "please enter your account number", or "would you like to speak to someone in housewares, electronics, or groceries?".

Next at step 306, a determination may be made whether or not an answer to the question is available from the information collected by the training flowchart 200, and previous information collected. The voice prompt avatar program 120A, 120B may determine whether the answer is available from cognitively analyzing the statement and/or question received, and cognitively determining if information is available as collected and stored from the training flowchart 200, based on the user goal. If the answer is available (step 306, "Yes" branch), the voice prompt avatar program 120A, 120B may continue to step 308 to provide an answer. If the answer is not available or a communication with the automated voice prompt system cannot be understood or processed (step 306, "No" branch), the voice prompt avatar program 120A, 120B may continue to step 312 to alert the user.

At step 308, the cognitively determined answer may be provided to the target by the voice prompt avatar program 120A, 120B. The answer may be provided by a verbal statement, a telephone number tone, or stated out loud over a phone connection, or other method of communication. Examples of a response may be "89765", or "housewares".

Next, at step 310, a determination may be made whether or not the dialog is concluded. In an embodiment, the user goal has been achieved or accomplished and the dialog has ended. In an embodiment, the voice prompt avatar program 120A, 120B may communicate to the user a status of the dialog or inquiry with the target, for example that the goal is achieved, or not achieved. The communication may be by text, email, alert, or other method. If the dialog is concluded (step 310, "Yes" branch), the process flowchart 300 may end. If the dialog is not concluded (step 310, "No" branch), the process flowchart 300 may return to step 304 to evaluate a question from the dialog. In an example of a phone call interaction, the phone call may be disconnected. In an embodiment, the dialog may be ended by the target, and voice prompt avatar program 120A, 120B may re-attempt to communicate with the target to attempt to achieve the goal.

At step 312, after determination that an answer is not available at step 306, the user may be alerted. The alert may be a text, an email, a spoken question, an alarm beep, among other methods. In an embodiment, the voice prompt avatar program 120A, 120B may determine that a human is on the phone from the target, rather than an automated voice prompt system, and may alert the user to take over the interaction with the target.

At step 314, an answer may be collected from the user regarding the question from step 304. The user may provide the answer by text, email, verbal response, through a graphical user interface or hardware input device, such as a keyboard, or other method. The voice prompt avatar program 300 may store the answer as per the training flowchart 200 in a repository, such as the database 116.

Next at step 316, the user may be prompted to determine if the voice prompt avatar program 120A, 120B should take over the conversation with the target via text, email, a spoken question, or other method. The user may response in a corresponding format within which the user was prompted or in a different format, such as by text, email, verbal response, or other method. The voice prompt avatar program 120A, 120B may collect and analyze a response from the user and determine if the user would like to continue the conversation themselves. If the user would not like to continue the conversation themselves (step 316, "No" branch), the voice prompt avatar program 300 may continue to step 308 to provide an answer. If the user would like to continue the conversation themselves (step 316, "Yes" branch), the voice prompt avatar program 300 may terminate.

In an alternate embodiment, the voice prompt avatar program 300 may ask the user if they would like to take over the conversation, and then collect the user answers as the user responds to one or more questions.

The voice prompt avatar program 120A, 120B provides a cognitive solution for users of voice-prompt services who wish to avoid wasting time on traversing complex menu systems. The user may completely avoid interacting with the target or may reduce the amount of time spend on the phone with the target, by have the voice prompt avatar program 300 provide answers to questions during a dialog with the target.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
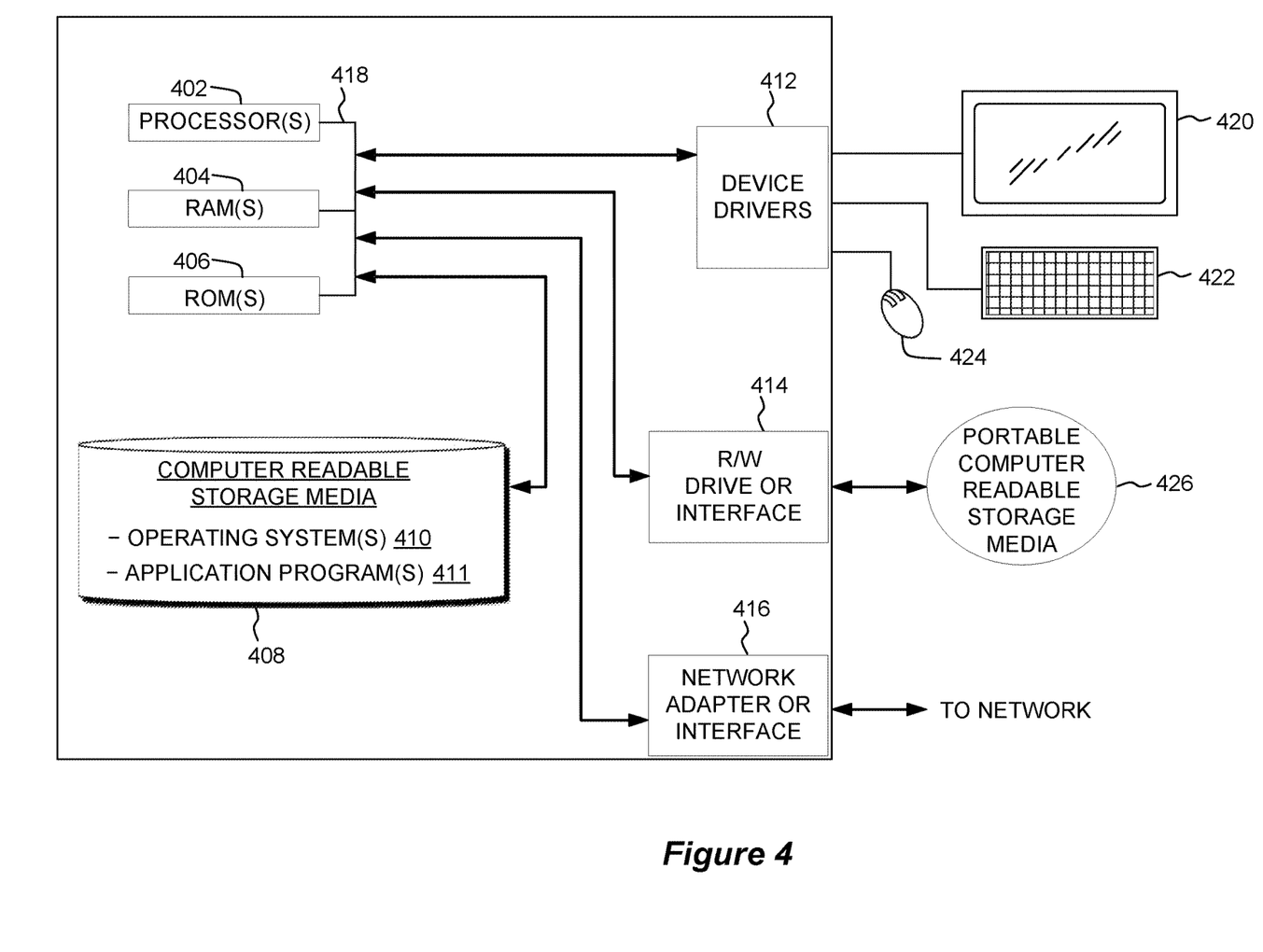
FIG. 4 is a block diagram of internal and external components of computers and servers depicted in FIG. 1, in accordance with an embodiment of the present invention.
Figure 5:
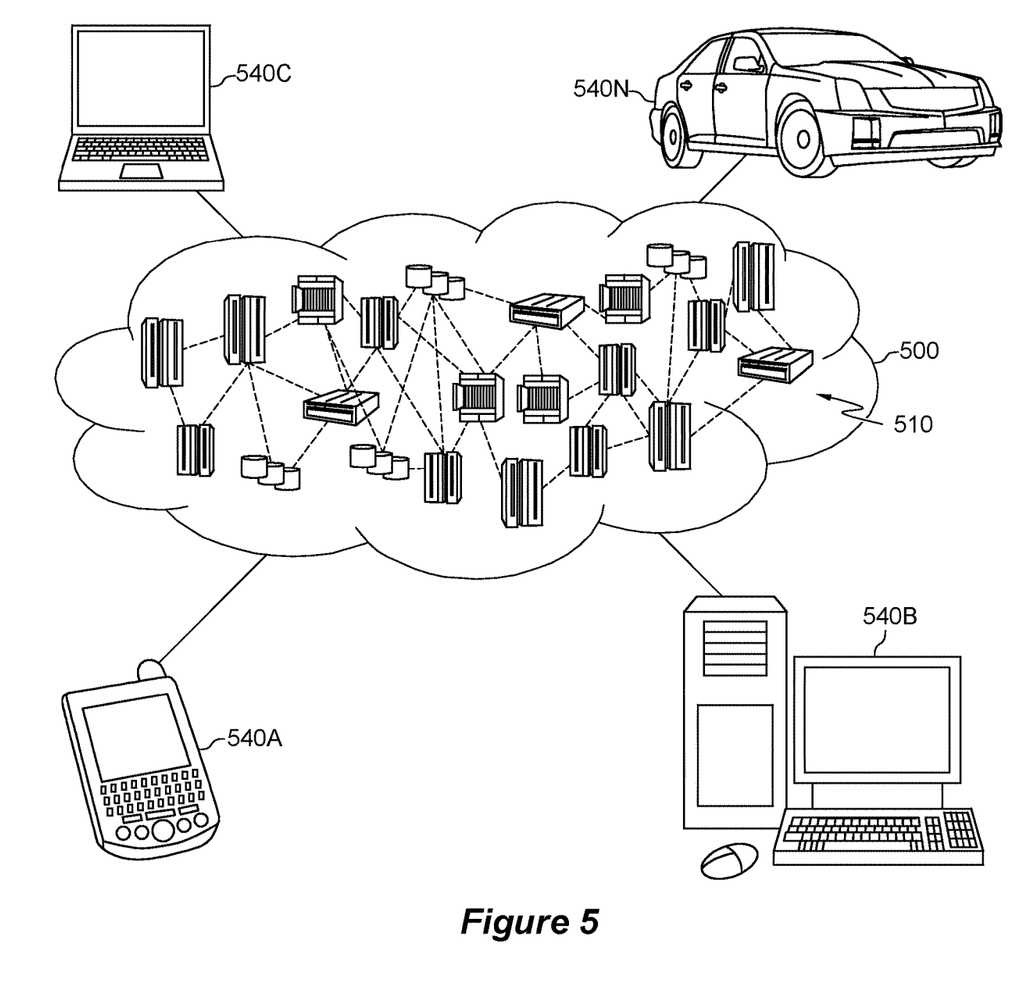
FIG. 5 is a block diagram of functional layers of an illustrative cloud computing environment, including the distributed data processing environment depicted in FIG. 1, in accordance with an embodiment of the present disclosure.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the voice prompt avatar program 300, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
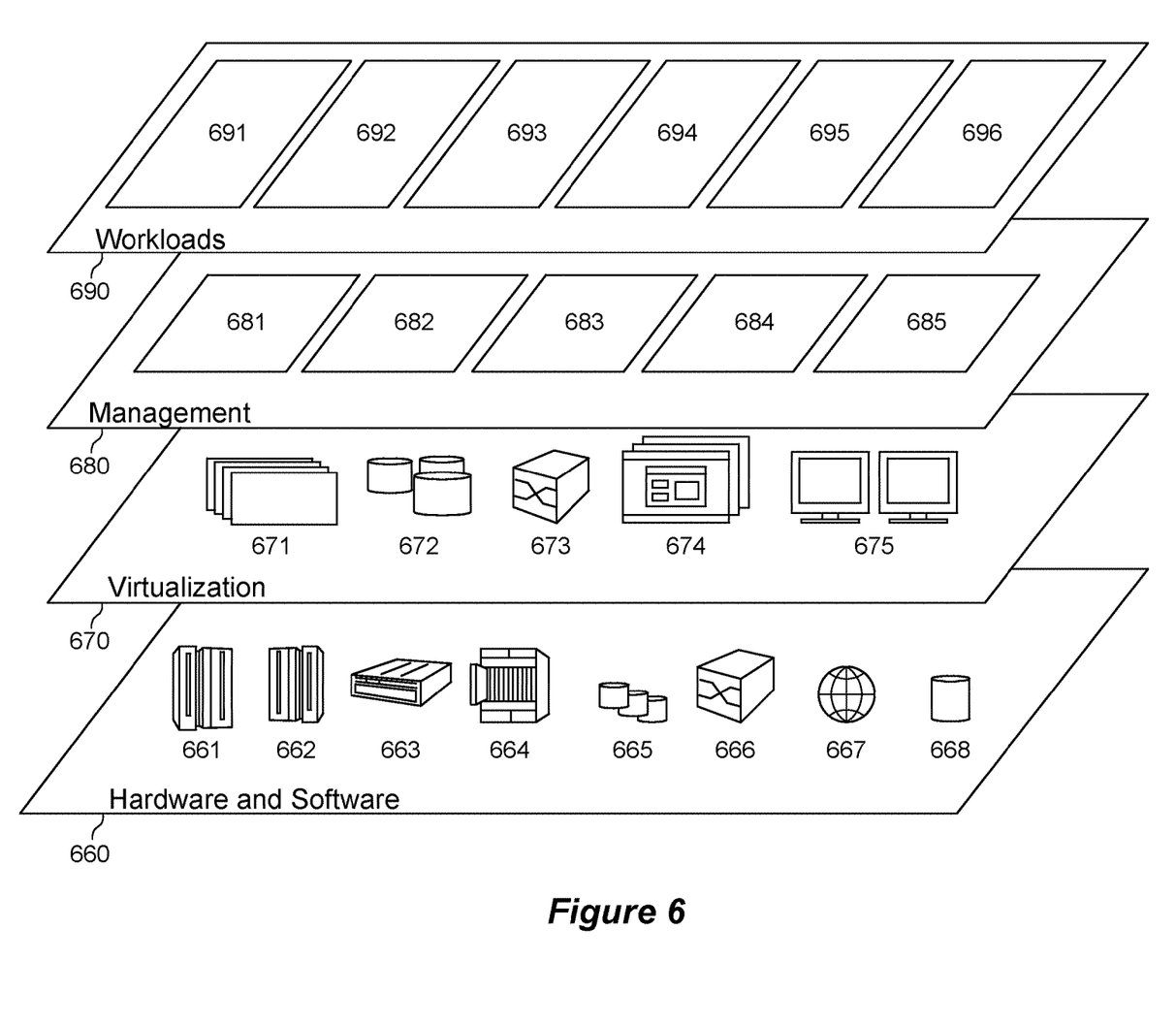
FIG. 6 is a functional block diagram of functional layers of the illustrative cloud computing environment of FIG. 5, in accordance with an embodiment of the present invention.

Referring now to FIG. 6, a set of functional abstraction layers provided by cloud computing environment 500 (as shown in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 110 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and avatar program 696. The avatar program 696 may relate to providing voice responses to voice questions on a phone call, for example, the voice prompt avatar program 300.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for a cognitive dialoguing avatar, the method comprising:
training a user personalized cognitive dialogue avatar with personal information of a user, the personal information of the user comprises a user name, a user address, a user account number, a user goal and a target entity;
initiating communication by the user personalized cognitive dialogue avatar, with the target entity, dependent upon the user personalized training of the user personalized cognitive dialogue avatar and the user goal;
determining by the user personalized cognitive dialogue avatar, an automated voice prompt system of the target entity is responding to the initiated communication, wherein the automated voice prompt system of the target entity is directly communicating with the user personalized cognitive dialogue avatar;
evaluating cognitively by the user personalized cognitive dialogue avatar, a question from the automated voice prompt system of the target entity;
determining cognitively by the user personalized cognitive dialogue avatar, an answer to the question from the automated voice prompt system of the target entity, dependent upon the user personalized training of the user personalized cognitive dialogue avatar and the user goal;
communicating by the user personalized cognitive dialogue avatar, the determined answer to the automated voice prompt system of the target entity;
determining by the user personalized cognitive dialogue avatar, that a live person of the target entity is responding to the initiated communication;
notifying by the user personalized cognitive dialogue avatar, that the live person of the target entity is responding to the initiated communication, dependent upon the determination that a live person at the target entity is responding to the initiated communication;
requesting by the user personalized cognitive dialogue avatar, the user to communicate directly with the live person of the target entity, dependent upon the notification that the live person of the target entity is responding to the initiated communication;
directing by the user personalized cognitive dialogue avatar, the user to take over the initiated communication based on a positive user response to the request that the user communicate directly with the live person of the target entity;
evaluating cognitively by the user personalized cognitive dialogue avatar, a question from the live person of the target entity based on a negative user response to the request that the user communicate directly with the live person of the target entity;
determining cognitively by the user personalized cognitive dialogue avatar, an answer to the question from the live person of the target, dependent upon the user personalized training of the user personalized cognitive dialogue avatar and the user goal, based on a negative user response to the request that the user communicate directly with the live person of the target entity;
communicating by the user personalized cognitive dialogue avatar, the determined answer to the question from the live person of the target entity based on a negative user response to the request that the user communicate directly with the live person of the target entity;
collecting by the user personalized cognitive dialogue avatar, additional information from the user and from the target entity during the initiated communication;
training the user personalized cognitive dialogue avatar based on the collected additional information; and
storing the collected additional information in the user information.

2. The method according to claim 1, further comprising:
storing the personal information of the user in a database, wherein the personal information of the user is selected from a group consisting of: a userid, a target entity phone number, a target entity web address, a user identification number, a claim number, a travel date, a user birth date, a user pin number, a user passcode, a security question answer, and a user phone number.

3. The method according to claim 1, further comprising:
dialing a target entity phone number;
listening to the automated voice prompt system from the dialog; and
communicating verbally the determined answer.

4. The method according to claim 1, further comprising:
determining cognitively an answer to the question is not available in the personal information of the user;
alerting the user that an answer to the question is not available in the personal information of the user;
collecting an answer from the user; and
storing the answer in the personal information of the user.

5. The method according to claim 1, further comprising:
determining cognitively an answer to the question is not available in the personal information of the user;
alerting the user that an answer to the question is not available;
notifying the user to take over the dialog;
collecting an answer from the user; and
storing the answer in the personal information of the user.

6. The method according to claim 1, further comprising:
detecting cognitively an option to select an action from a plurality of alternative actions; and
selecting an action cognitively based on the user goal.

7. The method according to claim 1, further comprising terminating the communication upon detecting the communication has transferred to a human.

8. The method according to claim 1, further comprising:
terminating the communication upon detecting the target entity has discontinued the communication.

9. The method according to claim 1, further comprising:
terminating the communication upon detecting the user goal is achieved.

10. A computer program product for a cognitive dialoguing avatar, the computer program product comprising:
one or more computer-readable storage media and program instructions stored on the one or more computer-readable storage media, the program instructions executable by a computing system to cause the computing system to perform a method comprising:
training a user personalized cognitive dialogue avatar with personal information of a user, the personal information of the user comprises a user name, a user address, a user account number, a user goal and a target entity;

initiating communication by the user personalized cognitive dialogue avatar, with the target entity, dependent upon the user personalized training of the user personalized cognitive dialogue avatar and the user goal;

determining by the user personalized cognitive dialogue avatar, an automated voice prompt system of the target entity is responding to the initiated communication, wherein the automated voice prompt system of the target entity is directly communicating with the user personalized cognitive dialogue avatar;

evaluating cognitively by the user personalized cognitive dialogue avatar, a question from the automated voice prompt system of the target entity;

determining cognitively by the user personalized cognitive dialogue avatar, an answer to the question from the automated voice prompt system of the target entity, dependent upon the user personalized training of the user personalized cognitive dialogue avatar and the user goal;

communicating by the user personalized cognitive dialogue avatar, the determined answer to the automated voice prompt system of the target entity;

determining by the user personalized cognitive dialogue avatar, that a live person at of the target entity is responding to the initiated communication;

notifying by the user personalized cognitive dialogue avatar, that the live person of the target entity is responding to the initiated communication, dependent upon the determination that a live person at the target entity is responding to the initiated communication;

requesting by the user personalized cognitive dialogue avatar, the user to communicate directly with the live person of the target entity, dependent upon the notification that the live person of the target entity is responding to the initiated communication;

directing by the user personalized cognitive dialogue avatar, the user to take over the initiated communication based on a positive user response to the request that the user communicate directly with the live person of the target entity;

evaluating cognitively by the user personalized cognitive dialogue avatar, a question from the live person of the target entity based on a negative user response to the request that the user communicate directly with the live person of the target entity;

determining cognitively by the user personalized cognitive dialogue avatar, an answer to the question from the live person of the target, dependent upon the user personalized training of the user personalized cognitive dialogue avatar and the user goal, based on a negative user response to the request that the user communicate directly with the live person of the target entity;

communicating by the user personalized cognitive dialogue avatar, the determined answer to the question from the live person of the target entity based on a negative user response to the request that the user communicate directly with the live person of the target entity;

collecting by the user personalized cognitive dialogue avatar, additional information from the user and from the target entity during the initiated communication;

training the user personalized cognitive dialogue avatar based on the collected additional information; and storing the collected additional information in the user information.

11. The computer program product according to claim 10, further comprising:
storing the personal information of the user in a database, wherein the personal information of the user is selected from a group consisting of: a userid, a target entity phone number, a target entity web address, a user identification number, a claim number, a travel date, a user birth date, a user pin number, a user passcode, a security question answer, and a user phone number.

12. The computer program product according to claim 10, further comprising:
dialing a target entity phone number;
listening to the automated voice prompt system from the dialog; and
communicating verbally the determined answer.

13. The computer program product according to claim 10, further comprising:
determining cognitively an answer to the question is not available in the user information;
program instructions to alert a user that an answer to the question is not available in the personal information of the user; and
collecting an answer from the user; and
storing the answer in the personal information of the user.

14. A computer system for a cognitive dialoguing avatar, the computer system comprising:
one or more computer processors, one or more computer-readable storage media, and program instructions stored on the one or more computer-readable storage media for execution by at least one of the one or more processors, wherein the computer system is capable of performing a method comprising:

training a user personalized cognitive dialogue avatar with personal information of a user, the personal information of the user comprises a user name, a user address, a user account number, a user goal and a target entity;

initiating communication by the user personalized cognitive dialogue avatar, with the target entity, dependent upon the user personalized training of the user personalized cognitive dialogue avatar and the user goal;

determining by the user personalized cognitive dialogue avatar, an automated voice prompt system of the target entity is responding to the initiated communication, wherein the automated voice prompt system of the target entity is directly communicating with the user personalized cognitive dialogue avatar;

evaluating cognitively by the user personalized cognitive dialogue avatar, a question from the automated voice prompt system of the target entity;

determining cognitively by the user personalized cognitive dialogue avatar, an answer to the question from the automated voice prompt system of the target entity, dependent upon the user personalized training of the user personalized cognitive dialogue avatar and the user goal;

communicating by the user personalized cognitive dialogue avatar, the determined answer to the automated voice prompt system of the target entity;

determining by the user personalized cognitive dialogue avatar, that a live person at of the target entity is responding to the initiated communication;

notifying by the user personalized cognitive dialogue avatar, that the live person of the target entity is responding to the initiated communication, dependent upon the determination that a live person at the target entity is responding to the initiated communication;

requesting by the user personalized cognitive dialogue avatar, the user to communicate directly with the live person of the target entity, dependent upon the notification that the live person of the target entity is responding to the initiated communication;

directing by the user personalized cognitive dialogue avatar, the user to take over the initiated communication based on a positive user response to the request that the user communicate directly with the live person of the target entity;

evaluating cognitively by the user personalized cognitive dialogue avatar, a question from the live person of the target entity based on a negative user response to the request that the user communicate directly with the live person of the target entity;

determining cognitively by the user personalized cognitive dialogue avatar, an answer to the question from the live person of the target, dependent upon the user personalized training of the user personalized cognitive dialogue avatar and the user goal, based on a negative user response to the request that the user communicate directly with the live person of the target entity;

communicating by the user personalized cognitive dialogue avatar, the determined answer to the question from the live person of the target entity based on a negative user response to the request that the user communicate directly with the live person of the target entity;

collecting by the user personalized cognitive dialogue avatar, additional information from the user and from the target entity during the initiated communication;

training the user personalized cognitive dialogue avatar based on the collected additional information; and storing the collected additional information in the user information.

15. The computer system according to claim 14, further comprising:
    determining cognitively an answer to the question is not available in the personal information of the user;
    alerting the user that an answer to the question is not available; and
    notifying the user to take over the dialog;
    collecting an answer from the user; and
    storing the answer in the personal information of the user.

16. The computer system according to claim 14, further comprising:
    detecting cognitively an option to select an action from a plurality of alternative action; and
    selecting an action cognitively based on the user goal.

17. The computer system according to claim 14, further comprising:
    terminating the communication upon detecting the communication has transferred to a human.

18. The computer system according to claim 14, further comprising:
    terminating the communication upon detecting the user goal is achieved.

* * * * *